United States Patent

[11] 3,576,402

[72] Inventors Gerald P. Baker
Englishtown, N.J.;
John E. Edington, Indianapolis; Ralston H. Robertson, Jr., Tippecanoe, Ind.

[21] Appl. No. 712,701
[22] Filed Mar. 13, 1968
[45] Patented Apr. 27, 1971
[73] Assignee Bell Telephone Laboratories, Incorporated
Murray Hill, N.J.

[54] CIRCUIT FOR COIN TELEPHONE SET IN MOBILE RADIO TELEPHONE SYSTEM
1 Claim, 2 Drawing Figs.

[52] U.S. Cl. .......... 179/41
[51] Int. Cl. .......... H04m 5/00
[50] Field of Search .......... 179/41 (A), 90 (K)

[56] References Cited

UNITED STATES PATENTS

| | | | |
|---|---|---|---|
| 2,607,887 | 8/1952 | Gissler et al. | 325/51 |
| 2,671,167 | 3/1954 | Kulansky | 325/155 |
| 3,087,998 | 4/1963 | Stewart et al. | 179/41A |
| 3,281,541 | 10/1966 | Learner | 179/90K |

OTHER REFERENCES

Ryder: ELECTRONIC FUNDAMENTALS AND APPLICATIONS, 1965. pps. 535, 546— 548.

*Primary Examiner*—Kathleen H. Claffy
*Assistant Examiner*—Thomas L. Kundert
*Attorneys*—R. J. Guenther and Edwin B. Cave

ABSTRACT: In a coin telephone set adapted for use in a mobile radio telephone system that provides phone service on trains, for example, signaling reliability is enhanced by the employment of means including a timing circuit for ensuring the transmission of multifrequency dial signals of limited duration irrespective of the duration of the manual actuation of the dial.

INVENTORS G. P. BAKER
J. E. EDINGTON
R. H. ROBERTSON, JR.

BY [signature]
ATTORNEY

CIRCUIT FOR COIN TELEPHONE SET IN MOBILE RADIO TELEPHONE SYSTEM

BACKGROUND OF THE INVENTION

1. Field of the Invention

This invention relates to coin telephone circuits and more particularly to the signaling circuits of coin telephones adapted for use in mobile radio telephone systems.

2. Description of the Prior Art

Mobile radio telephones including coin telephones and their interconnecting switching systems are well known in the art, being shown for example in U.S. Pat. No. 2,607,887 issued to F. E. Gissler et al. Aug. 19, 1952 and in U.S. Pat. No. 3,355,556 issued to R. A. Chaney Nov. 28, 1967. The relative complexity of mobile radio telephone circuits and systems as compared to conventional telephony is in part the result of various modifications and special features that have been introduced in an attempt to overcome the many unique problems inherent in linking radio and telephone transmission with telephone switching and signaling. The basic problems of course relate to the inherent complexity of telephone systems that involve both fixed and mobile stations.

Illustrative of these problems is the need to provide a signal to mobile stations, such as trains, to indicate also whether the train is within reliable communication range of one of the fixed stations. Although many of these problems have been solved by the prior art, unsolved problems continue to exist including, for example, the problems relating the to the employment of multifrequency dial signaling. In multifrequency dial signal generating apparatus for conventional telephones, the duration of each multifrequency tone burst is wholly within the control of the customer, so long as each dial operating button is held down for some brief minimal period sufficient to energize the signal oscillator. Thus, the particular combinations of tone corresponding to the operation of a dial button or digit will continue to be generated and transmitted as long as the button is held down. Although suitable for conventional telephony, signal tones of relatively extended duration are, for the reasons indicated below, undesirable for radio telephony.

Periodic momentary signal fade that is inherent in mobile radio systems is generally acceptable and may indeed be unnoticeable insofar as the transmission of speech is concerned. It has been found, however, that the same incidence of signal fade is often intolerable when it occurs during the transmission of multifrequency dial signals. In the case of dial signals that are unduly prolonged, the likelihood that any particular signal will be interrupted one or more times by a momentary transmission fadeout is increased. Such interruptions often cause the signal receiving equipment to translate the single digit transmission as a pair of the same digits and, as a results, an unwanted connection may be completed.

Accordingly, one of the objects of the invention is to enhance the reliability of multifrequency dial generated signals in mobile radio telephone systems.

SUMMARY OF THE INVENTION

The foregoing object and additional objects are achieved in accordance with the principles of the invention by incorporating a timing arrangement in circuit combination with a multifrequency signal generating dial. The timing arrangement ensures that only a preselected maximum duration dial signal can be generated irrespective of the duration that a particular dial button is held operated.

In one illustrative embodiment of the invention the timing arrangement is a two-transistor monostable multivibrator circuit that is triggered into operation by the application of an energizing current by means of a set of contacts on the common switch of the dial. A third transistor provides a switching function between the multivibrator output and the active element of the dial signal oscillator. In accordance with a feature of the invention a transformer is uniquely employed as a part of the telephone circuit to match the input impedance of the radio transmitter with the dial.

The principles of the invention together with additional objects and features thereof will be fully apprehended from the following description of an illustrative embodiment together with the appended drawing.

DESCRIPTION OF AN ILLUSTRATIVE EMBODIMENT

Figures 1, 2:
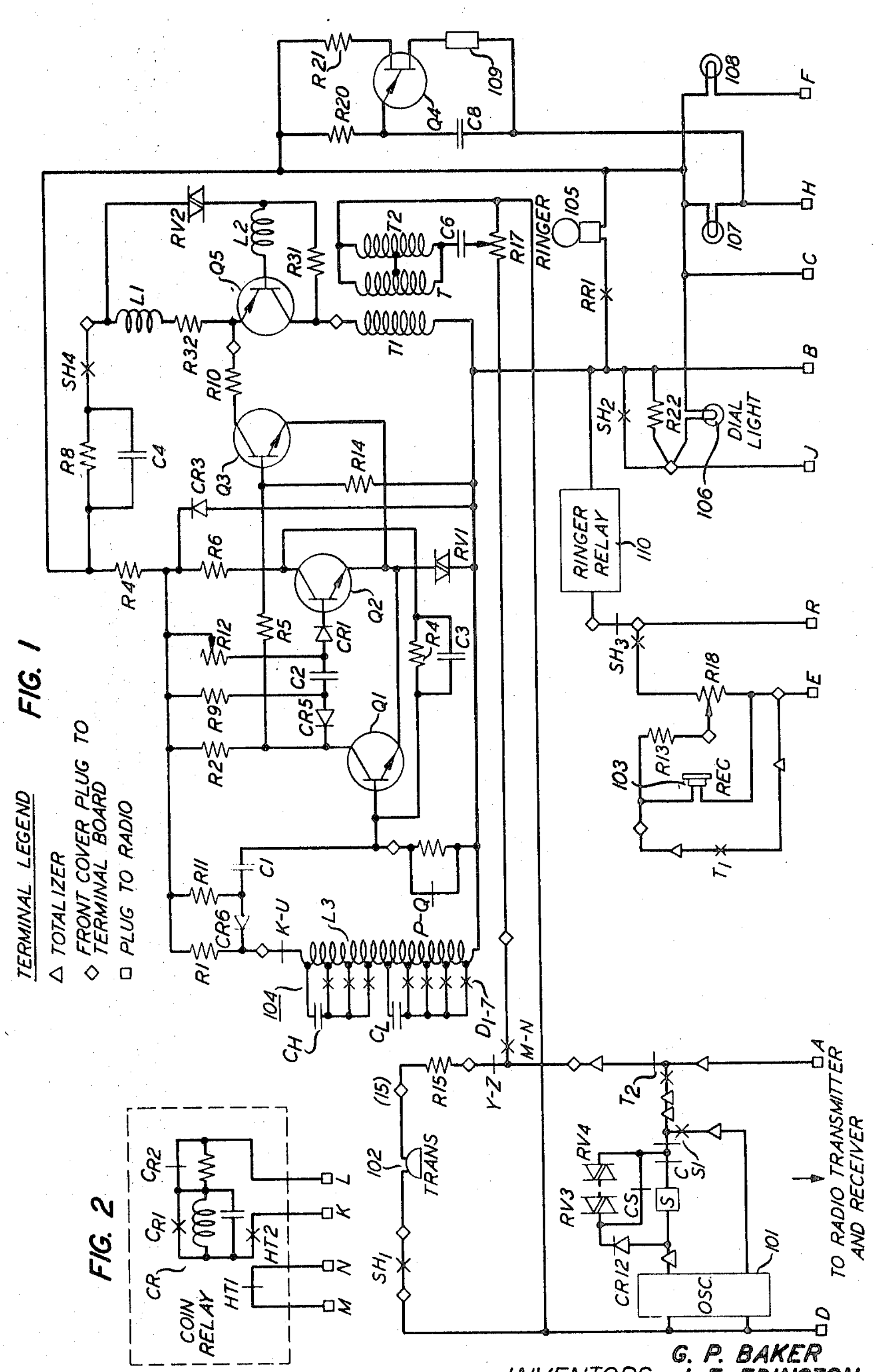
FIG. 1 is a schematic circuit diagram of a telephone circuit in accordance with the invention.
FIG. 2 is a schematic circuit diagram of the coin relay circuit employed in combination with the circuit shown in FIG. 1.

The mobile coin telephone set shown in the drawing includes all of the basic coin handling and signaling features a of a conventional multifrequency signaling coin telephone and in this respect is similar to the coin telephone disclosed in U.S. Pat. No. 3,146,312 issued to E. R. Andregg et al. on Aug. 25, 1964. It is significantly different from a standard coin telephone, however, in that it is designed to operate in conjunction with a mobile radio system.

GENERAL DESCRIPTION

The circuit shown in FIG. 1 is connected to a totalizer circuit, to a front cover terminal board plug and to a plug that is accommodated by the radio equipment portion of the system. In the interests of simplicity and clarity, these connection elements are not shown but the specific points of connection to each are shown, and these may be identified from the terminal legend.

Among the conventional elements disclosed in FIG. 1 are the telephone transmitter 102, the telephone receiver 103, the pushbutton or TOUCH-TONE dial 104, the coin signal oscillator 101 and the dial signal oscillator which includes transistor Q5 as an active element. Make contacts $D_1$—$_7$ represent the contacts physically operated by the dial pushbuttons (not shown). Specific features included to meet the extra requirements for mobile coin telephony include a lighted visual display 107 to indicate to the customer that all transmission channels are busy, a visual lighted display 108 and a simultaneously operated audible signal generator 109 to signal the customer to terminate a call as the train or other mobile vehicle moves out of calling range.

The system operates on a four-wire basis with a modified post-pay-type operation. In accordance with the invention, the multifrequency dial digit time is limited by the addition of a timer circuit which includes the monostable multivibrator having as active elements transistors Q1 and Q2, together with associated passive circuit elements and a switching transistor Q3.

GENERAL OPERATION

As indicated above, the telephone circuit shown in FIGS. 1 and 2 is designed to operate in a four-wire system with separate transmitting and receiving circuits. Sidetone is supplied conventionally via the base transmitter and a hybrid circuit in the control terminal (not shown). Upon removal of the handset from the switch hook (not shown) two operations are possible:

1. If all radio channels are busy the "channels busy" light 108 signals the customer.
2. If channels are available, a channel will be seized, the customer will receive dial tone and the call may be initiated. The desired number is then dialed by the pushbutton dial 104.

In accordance with the invention, each TOUCH-TONE digit's signal length is under control of a timer which is activated, in a manner described below herein, whenever, a dial button is depressed. When dialing is completed, the operator intercepts the call and requests the required deposit.

After the deposit has been conventionally verified by the operator, the call is transferred through to the central office equipment. Coin collection and refund are handled conventionally by the coin relay CR, FIG. 2, although the control signals are received initially by way of the coin signaling unit (not shown). During the course of a successfully completed call, collection is designed to occur automatically approximately 2½ minutes after call initiation. Subsequent deposits for overtime periods are collected manually by the operator. During an extended call, a situation may arise in which the train or other mobile unit passes out of the zones to which the particular channel frequencies being used by the customer are assigned. In this event, the call is automatically terminated. Approximately 1 minute before termination the "please hang up" light and the accompanying audible signal begin simultaneously to warn the customer.

Power for the coin signal oscillator 101 is supplied from the terminals designated A and D. The power supply for the dial 104, for the timer circuit, which includes transistors Q1 and Q2, for the lights 106, 107 and 108 and for the electrical acoustical buzzer 109, is supplied from terminals B and C.

In order to facilitate four-wire operation of the set, the conventional speech network with its hybrid coil has been removed and the input impedance of the radio transmitter (not shown) is matched to the impedance of the dial 104 with a transformer T.

DETAILED DESCRIPTION

Additional features of the invention as well as the functions of the circuit elements not already mentioned may best be presented in terms of a detailed description of the call handling sequence.

When the handset (not shown) is removed from the switch hook (not shown) the switch hook contacts SH1, SH2, SH3 and SH4 operate. Contact SH1 couples the handset transmitter 102 to the output terminals A and D. Contact SH2 supplies negative battery voltage A− to the switch hook terminal J which provides an off-hook indication to the supervisory unit and also connects negative battery to the dial light 106. The resistor R22 serves to isolate partially the J terminal from the A+ source. The receiving path is completed through the normally open side of the SH3 transfer contacts and the receive level adjusting potentiometer R18 to the E and R terminals. The normally closed contact of the SH3 transfer contacts disconnects the ringer relay 110. A+ potential from the C terminal is connected to the dial signal oscillator, transistor Q5, through the make contact SH4.

At this point the customer hears dial tone and begins to dial. The dial timer circuit with its active elements, transistors Q1, Q2 and Q3, is controlled by the dial common switch contacts Y–Z, M–N, P–Q and K–U which operate in the sequence indicated. Because of transients occurring upon operation of the frequency contacts $D_{1-7}$, it is essential that these contacts operate before the contacts P–Q. Operation of the Y–Z and M–N contacts isolates the handset transmitter 102 from the A and D terminals and couples the secondary T2 of the dial output transformer T through the dial signal level adjusting potentiometer R17 to the A terminal output.

Upon operation of the P–Q and K–U contacts, the timer circuit triggers and a TOUCH-TONE signal of approximately 90-—100 milliseconds duration appears across the A and D terminals. Control of the dial 104 with its associated oscillator transistor Q5 is through the switching transistor Q3 which is connected across the collector-emitter junction of transistor Q5. When transistor Q3 is saturated, the effective resistance seen by this junction is low which prevents oscillator operation. Switching at the proper time is achieved through the use of the monostable multivibrator timing circuit employing transistors Q1 and Q2.

In the quiescent state, transistor Q1 is in a cutoff condition and transistors Q2 and Q3 are saturated. Capacitor C2 is charged to the voltage developed across regulating diode CR3. The normally closed P–Q contacts ground the base of transistor Q1 so that false triggering is prevented. Excitation for the dial oscillator, transistor Q5, is supplied by way of a path which includes the resistors R1 and R11 and the break contacts K—U. When a dial pushbutton is operated, contacts P–Q and K–U operate in that order to trigger the multivibrator, transistors Q1 and Q2, through the capacitor C1. The triggering action drives transistor Q1 into saturation and transistors Q2 and Q3 into a cutoff state, thus allowing the generation of dial signals. Capacitor C2 begins to charge in the opposite direction through the timing resistor R12.

When the voltage on the right hand side of capacitor C2 reaches the turn-on threshold of the diode CR1 and is hence applied to the base-emitter junction of transistor Q2, transistor Q2 is saturated and the monostable circuit returns to its stable state, thus discontinuing the dial frequency output. During this time, capacitor C1 has charged through resistor R11, thus affording protection against false triggering for the remaining time that the button is held down. When the dial button is released, the circuit returns to its normal state. If, however, the button is released before sufficient time has elapsed to permit the timer to run out, the circuit reverts immediately to the quiescent condition with the duration of the dial signal being determined by the length of time the button is depressed. As indicated above, the timing period established by the operation of the timer is typically on the order of 90-—100 milliseconds. The diode CR5 and resistor R11 provide voltage reversal protection for the capacitor C2, and the diode CR6 and resistor R11 afford similar protection for the capacitor C1. Temperature stability of the circuit is enhanced by the addition of the varistor RV1.

The existence of a DC potential across the A and the D terminals requires that the secondary winding T2 of the dial output transformer T be isolated by capacitor C6. It is necessary to minimize the DC shift occurring across the A and D terminals when the M–N and Y–Z contacts operate, and for this purpose, a balancing resistor R15 is added in series with the handset transmitter 102. Because of manufacturing and operating variations in the DC resistance of the transmitter 102, the DC shift indicated cannot be completely eliminated by resistive balancing. For practical purposes, however, the shift is sufficiently reduced by the combination of resistor R15 with a selected resistance level at the potentiometer R17.

When dialing is completed, the operator requests a deposit. The deposited coin passes through the chute and totalizer (not shown), causing the totalizer's transfer contacts $T_2$ to operate. Coin telephone chutes and totalizers are well known in the art, being shown for example, respectively, in U.S. Pat. No. 3,169,625 issued to J. L. Peterson Feb. 16, 1965, and in U.S. Pat. No. 3,146,312 cited above. This action removes the handset transmitter 102 from the output path and couples the coin signal oscillator 101 to the leads from the A and D terminals. These leads serve as a power supply path and also as an output path for the coin signals. The normally open contact $T_1$, also operated by the totalizer, closes to short out the receiver 103, thus preventing customer monitoring of the coin deposit signals. Also at this time the break contact HT1, FIG. 2, of the coin relay hopper trigger (not shown) opens. This function is used by the coin signaling unit, through the M and N terminals, to provide a deposit refund for the on-hook condition or in the event that a channel has not been seized. The normally open hopper trigger contact HT2 closes to provide access to the coin relay CR by way of the K and L terminals which are fed from the coin signaling unit. The shunting transfer contacts $C_{R1}$ and $C_{R2}$ operate when the armature (not shown) of the coin relay CR moves.

The totalizer and the coin chute assembly (not shown) as indicated above are basically the same as the totalizer and the chute assemblies currently in commercial use in conventional coin telephones. Certain minor modifications are necessary, however, to adapt these units to effect coin handling operations in a set in accordance with the invention. For example, the chute noise transmitter and brake latch have been removed and wiring changes are of course necessary to allow the coin signal unit to operate directly through the A and D terminals. Additionally, the $T_1$ contacts are adjusted to provide the receiver shorting function indicated and the normal initial rate contacts are removed. Application of a DC voltage, which may be on the order of 50 to 110 volts, by way of the coin signaling unit through the K and L terminals operates the coin relay CR for collections and refunds.

The electrical-acoustical buzzer 109 is a reciever unit driven by the unijunction transistor relaxation oscillator which includes transistor Q4, resistors R20 and R21 and capacitor C8. This type of sounding device is used, owing to the fact that conventional mechanical buzzers generate electrical noise and require excessive power which could overload the buzzer and light driver in the supervisory unit. As shown, the buzzer 109 is a two-terminal device connected in parallel with the "please hang up" light 107, permitting simultaneous operation of the light and buzzer.

When the termination of a call is necessary, the channel control unit supplies A− power to the H terminal at the rate of 0.5 cycles per second, causing intermittent operation of the buzzer-light combination at this rate. The "channels busy" light 108 is operated when the supervisory unit supplies A− power to the F terminal. Ringing is accomplished through the use of the ringer relay 110 with its contact RR1 and the ringer 105. In the on-hook condition an incoming call causes the radio to supply A+ power to the E terminal which operates the ringer relay 110. The ringer 105 is connected across battery through the normally open contacts RR1 and rings when the relay 110 is operated.

It is to be understood that the embodiment described herein is merely illustrative of the principles of the invention. Various modifications thereto may be effected by persons skilled in the art without departing from the spirit and scope of the invention.

We claim:

1. A mobile telephone set comprising, in combination, multifrequency dial signal generating means including pushbuttons, means for applying voice current from said set and signals from said dial to a radio transmitter, and means for limiting the duration of signals from said dial to a period equal to the duration of the operation of one of said pushbuttons or to a preselected duration, whichever is shorter, whereby spurious signaling resulting from gaps and fading in unduly long signals is avoided, said signal generating means including a multifrequency oscillator having frequency determining elements and an active element and said limiting means including a monostable multivibrator and a transistor switch connected in tandem between said frequency determining elements and said active element.